(12) United States Patent
Sonobe et al.

(10) Patent No.: US 11,414,032 B2
(45) Date of Patent: Aug. 16, 2022

(54) CLOSED CROSS-SECTIONAL STRUCTURE MEMBER HAVING HIGH COLLISION PERFORMANCE AND AUTOMOBILE BODY STRUCTURE

(71) Applicant: NIPPON STEEL CORPORATION, Tokyo (JP)

(72) Inventors: Soma Sonobe, Tokyo (JP); Atsushi Ono, Tokyo (JP); Yutaka Mikazuki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 87 days.

(21) Appl. No.: 16/972,476

(22) PCT Filed: Jun. 13, 2019

(86) PCT No.: PCT/JP2019/023457
§ 371 (c)(1),
(2) Date: Dec. 4, 2020

(87) PCT Pub. No.: WO2019/240214
PCT Pub. Date: Dec. 19, 2019

(65) Prior Publication Data
US 2021/0162940 A1    Jun. 3, 2021

(30) Foreign Application Priority Data

Jun. 14, 2018 (JP) .............................. JP2018-113385

(51) Int. Cl.
*B60J 7/00* (2006.01)
*B60R 19/18* (2006.01)
(Continued)

(52) U.S. Cl.
CPC .............. *B60R 19/18* (2013.01); *B62D 21/15* (2013.01); *B62D 25/02* (2013.01); *B60R 2019/1806* (2013.01)

(58) Field of Classification Search
CPC ............ H04W 72/042; H04W 72/0453; A61K 45/06; A61P 35/00; A61P 3/10;
(Continued)

(56) References Cited

U.S. PATENT DOCUMENTS 6,485,072 B1 * 11/2002 Werner ................... B60R 19/34
296/187.05
2010/0127519 A1 * 5/2010 Wakabayashi .......... B60R 19/18
293/120

(Continued)

FOREIGN PATENT DOCUMENTS

JP          5-28123  Y2    7/1993
JP       2004-314845 A    11/2004
(Continued)

*Primary Examiner* — Kiran B Patel
(74) *Attorney, Agent, or Firm* — Birch, Stewart, Kolasch & Birch, LLP

(57) ABSTRACT

A closed cross-sectional structure member includes a hollow member, the hollow member having a collision side wall part located on a collision side, an opposed collision side wall part opposing the collision side wall part, a pair of first side wall part and second side wall part connecting with end portions of the collision side wall part and end portions of the opposed collision side wall part, a first inner wall part extending from the first side wall part to an inside of the hollow member, a second inner wall part extending from the second side wall part to the inside of the hollow member, a third inner wall part connecting with the first inner wall part and the collision side wall part, and a fourth inner wall part connecting with the second inner wall part and the collision side wall part.

20 Claims, 11 Drawing Sheets

(51) Int. Cl.
*B62D 21/15* (2006.01)
*B62D 25/02* (2006.01)

(58) Field of Classification Search
CPC .............. A61P 43/00; A01N 25/32; H01L 2224/32245; Y02E 60/50; B41L 1/36
See application file for complete search history.

(56) References Cited

U.S. PATENT DOCUMENTS

| | | | |
|---|---|---|---|
| 2010/0201139 | A1* | 8/2010 | Hashimura ............. B60R 19/18 |
| | | | 293/133 |
| 2013/0187410 | A1 | 7/2013 | Wawers |
| 2016/0332673 | A1 | 11/2016 | Cazes et al. |
| 2017/0008568 | A1 | 1/2017 | Heitkamp et al. |
| 2021/0162940 | A1* | 6/2021 | Sonobe ................. B62D 21/15 |

FOREIGN PATENT DOCUMENTS

| | | |
|---|---|---|
| JP | 2010-120581 A | 6/2010 |
| JP | 2015-193383 A | 11/2015 |

\* cited by examiner

SIDE SILL

FRONT BUMPER BEAM

REAR BUMPER BEAM

CLOSED CROSS-SECTIONAL STRUCTURE MEMBER HAVING HIGH COLLISION PERFORMANCE AND AUTOMOBILE BODY STRUCTURE

TECHNICAL FIELD

The present invention relates to a closed cross-sectional structure member exhibiting high energy absorbing performance, for example, in front collision of an automobile or the like.

BACKGROUND ART

An example of a structure exhibiting high energy absorbing performance in collision of an automobile is a bumper structure. The bumper structure of the automobile is composed of a bumper beam and a crush box and, for example, in front collision of the automobile, in particular, in light collision, the bumper beam undergoes bending deformation and the crush box undergoes crushing deformation, thereby absorbing impact to prevent a load from transferring to a rear part of the automobile. In this event, the bumper beam plays a role of a collision energy absorbing site.

In recent years, the fuel consumption restriction becomes strict in the world and the reduction in weight of the automobile body structure is promoted. On the other hand, the collision safety is also strictly required, so that the achievement of both of the improvement in collision performance and the reduction in weight is required, and an increase in strength and reduction in thickness of the body and the development of electric vehicles are made by automobile manufacturers. In particular, in the electric vehicles, an increase in cruising distance is required and an automobile body in which a large capacity battery is mounted under the floor is started to be developed. This makes the wheelbase longer, and therefore the collision energy equal to that in gasoline vehicles needs to be absorbed by a short front overhang. For this reason, the bumper beam is required to have high buckling strength and absorbed energy performance. Further, the reduction in weight of the automobile body is also required in the gasoline automobiles, and the light-weight bumper beam having high buckling strength and absorbed energy performance is required.

Examples of a conventional bumper beam are described in Patent Documents 1, 2. Patent Document 1 discloses a structure in which three closed cross-sections are formed inside the bumper beam by providing a hat-shaped member in another hat-shaped member. In the structure of Patent Document 1, a recess is formed in a top surface of the hat-shaped member on the outside of the two hat-shaped members, and the recess is located in a region at the middle of the aforementioned three regions. Patent Document 2 discloses an invention in which two closed cross-sectional spaces are arranged including two ridge line parts between side surfaces and a rear surface in the bumper beam having the closed cross-sectional structure member.

PRIOR ART DOCUMENT

Patent Document

Patent Document 1: Japanese Laid-open Patent Publication No. 2010-120581
Patent Document 2: Japanese Laid-open Patent Publication No. 2015-193383

SUMMARY OF THE INVENTION

Problems to be Solved by the Invention

However, in Patent Document 1, the application of the recess shape suppresses the fall-down the side surfaces of the hat-shaped member on the inside when the bumper beam receives bending deformation, but cannot suppress the fall-down of the side surfaces of the hat-shaped member on the outside which are starting points of buckling of the bumper beam itself. Therefore, there is room for improvement in mass efficiency regarding the absorbed energy performance of the bumper beam. Besides, in Patent Document 2, the increase in collision load is made gentle by intentionally decreasing the rigidity of a contact surface. Therefore, bucking is caused early in collision, and there is room for improvement in mass efficiency regarding the absorbed energy performance. Further, causing the buckling in light collision increases the amount of the bumper beam retracting to the rear of the automobile body, so that the bumper beam possibly interferes with a radiator support core to significantly decrease the repairability of the automobile body.

The present invention has been made in consideration of the problem of the prior art, and has an object to provide a closed cross-sectional structure member having high proof stress (namely, the suppression of an amount of a member intruding into a vehicle-interior side) and high absorbed energy performance by suppressing a cross-section collapse in collision.

Means for Solving the Problems

In order to solve the above problem, the present inventors carried out a simulation of causing a pole to collide, from a direction vertical to a member longitudinal direction, with a top surface of a hat-shaped member in a closed cross-sectional structure member composed of the hat-shaped member and a closing plate. As a result of an investigation of the relation between a cross-section collapse behavior of the closed cross-sectional structure member and the energy absorption amount under the following condition, such a finding that the closed cross-sectional structure member exhibits high proof stress and high absorbed energy performance by (a) suppressing the fall-down of a pair of side wall parts of the closed cross-sectional structure member and (b) applying bending rigidity to a collision side wall part being a wall part on the collision side of the closed cross-sectional structure member has been obtained. Based on the finding, the present invention has been completed.

An aspect of the present invention is a closed cross-sectional structure member including a hollow member, the hollow member having, in a cross-section with a member longitudinal direction as a normal, a collision side wall part, an opposed collision side wall part, a first side wall part, a second side wall part, a first inner wall part, a second inner wall part, a third inner wall part, and a fourth inner wall part, wherein: the collision side wall part is a wall part located on a collision side; the opposed collision side wall part is a wall part opposing the collision side wall part and located on a side opposite to the collision side; the first side wall part and the second side wall part are a pair of wall parts connecting with end portions of the collision side wall part and end portions of the opposed collision side wall part; the first inner wall part is a wall part extending from the first side wall part to an inside of the hollow member; the second inner wall part is a wall part extending from the second side wall part to the inside of the hollow member; the third inner wall part is a wall part connecting with the first inner wall part and the collision side wall part; and the fourth inner wall part is a wall part connecting with the second inner wall part and the collision side wall part.

An aspect of the present invention according to another viewpoint is an automobile body structure, including the above closed cross-sectional structure member, wherein the collision side wall part is located on a vehicle-exterior side with respect to the opposed collision side wall part.

FIG. 1 and FIG. 2 are views illustrating examples of an automobile body structure 70 having a closed cross-sectional structure member. The closed cross-sectional structure member according to the present invention is applied, for example, as a front bumper beam and a side sill of an automobile illustrated in FIG. 1 and a rear bumper beam illustrated in FIG. 2, but an application target component is not limited to them. Further, the "collision side" relating to the present invention is a side coming into contact with another vehicle in collision, and indicates a vehicle-exterior side of a vehicle-exterior side and a vehicle-interior side of the automobile. For example, in the case where the closed cross-sectional structure member is a front bumper beam, the front side in a vehicle length direction corresponds to the vehicle-exterior side, so that the front side is the collision side. In this case, the rear side in the vehicle length direction corresponds to the vehicle-interior side, so that the rear side is the opposed collision side. Besides, for example, in the case where the closed cross-sectional structure member is a rear bumper beam, the rear side in the vehicle length direction corresponds to the vehicle-exterior side, so that the rear side is the collision side. In this case, the front side in the vehicle length direction corresponds to the vehicle-interior side, so that the front side is the opposed collision side. Besides, for example, in the case where the closed cross-sectional structure member is a side sill, the vehicle-exterior side in the vehicle width direction is the collision side and the vehicle-interior side in the vehicle width direction is the opposed collision side.

Effect of the Invention

According to the present invention, it is possible to provide a closed cross-sectional structure member having high proof stress and high absorbed energy performance by suppressing a cross-section collapse in collision.

EMBODIMENTS FOR CARRYING OUT INVENTION

Figure 1:
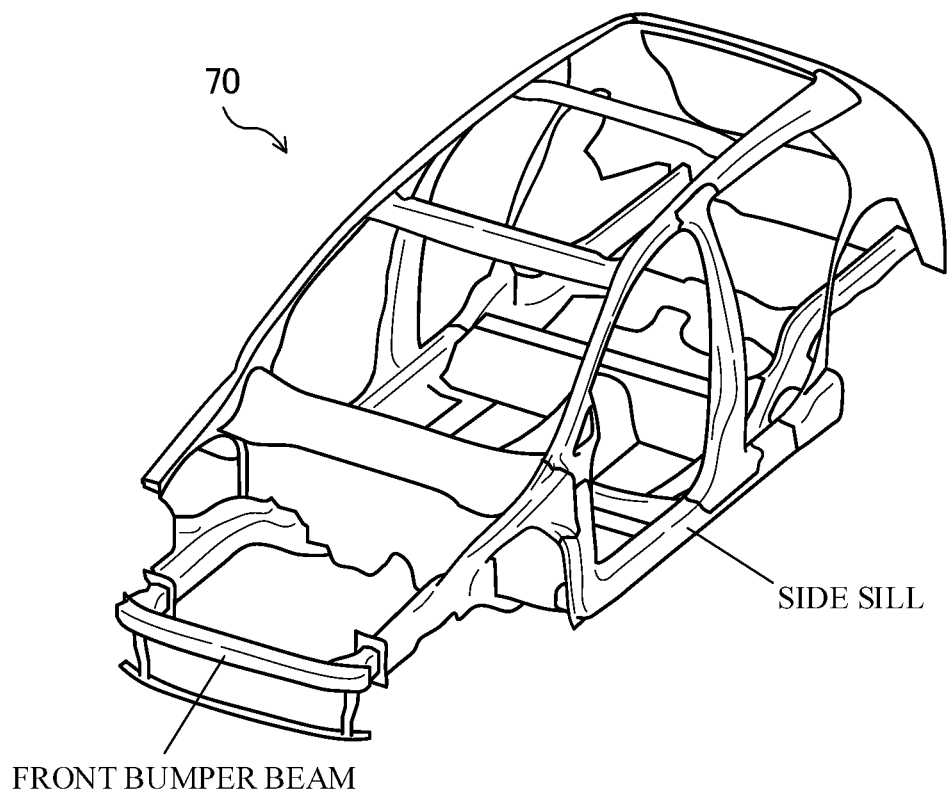
FIG. 1 is a view illustrating an example of an automobile body structure.
Figure 2:
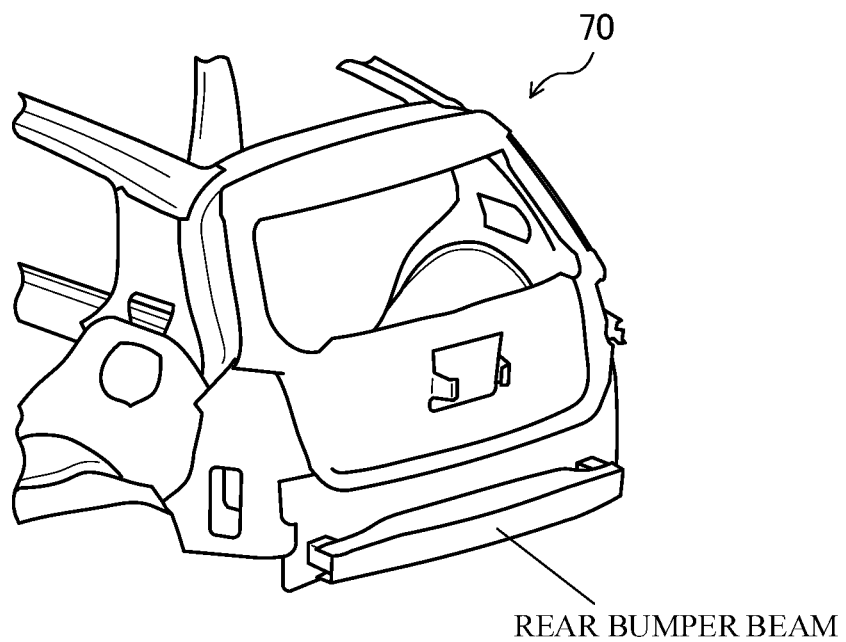
FIG. 2 is a view illustrating an example of the automobile body structure.

Hereinafter, embodiments of the present invention will be explained referring to the drawings. Note that the same codes are given to components having substantially the same functional configurations in the description and the drawings to omit duplicated explanation.

Though a bumper beam is exemplified as an example as a closed cross-sectional structure member in the following explanation, deformation modes as explained in the embodiments appear and can increase the maximum load and the absorbed energy in collision in a similar closed cross-sectional structure member. In other words, the closed cross-sectional structure member is not limited to the bumper beam.

First Embodiment

Figure 3:
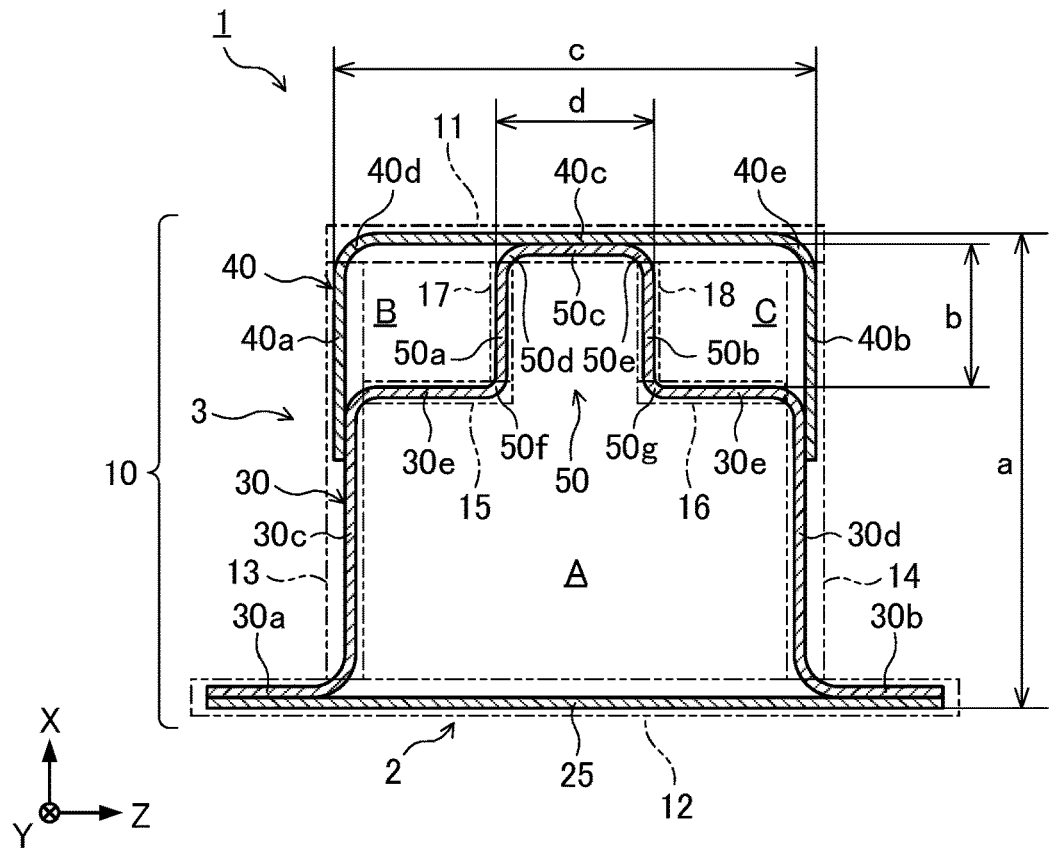
FIG. 3 is a cross-sectional view with a member longitudinal direction as a normal, illustrating a schematic configuration of a bumper beam according to a first embodiment of the present invention.

A closed cross-sectional structure member illustrated in FIG. 3 includes a hollow member 10 which has, in a cross-section with a member longitudinal direction Y as a normal, a collision side wall part 11, an opposed collision side wall part 12, a first side wall part 13, a second side wall part 14, a first inner wall part 15, a second inner wall part 16, a third inner wall part 17, and a fourth inner wall part 18. The collision side wall part 11 is a wall part located on a collision side. The opposed collision side wall part 12 is a wall part opposing the collision side wall part 11 and located on the side opposite to the collision side. The first side wall part 13 and the second side wall part 14 are a pair of wall parts connecting with end portions of the collision side wall part 11 and end portions of the opposed collision side wall part 12. The first inner wall part 15 is a wall part extending from the first side wall part 13 to the inside of the hollow member 10. The second inner wall part 16 is a wall part extending from the second side wall part 14 to the inside of the hollow member 10. The third inner wall part 17 is a wall part connecting with the first inner wall part 15 and the collision side wall part 11. The fourth inner wall part 18 is a wall part connecting with the second inner wall part 16 and the collision side wall part 11.

In the first embodiment, a bumper beam 1 as an example of the closed cross-sectional structure member is composed of a closing plate 25 which constitutes an inner member 2, and a hat-shaped member 30 and a reinforcement 40 which constitute an outer member 3. Note that the closing plate herein means a plate covering the opening side of the hat-shaped member.

The hat-shaped member 30 has, in a cross-section with the member longitudinal direction Y as a normal (vehicle width direction in the case of the bumper beam), two flanges 30a, 30b extending in a Z-direction (vehicle height direction in the case of the bumper beam), a pair of side surfaces 30c, 30d each extending to a vehicle-exterior side in an X-direction (vehicle length direction in the case of the bumper beam) from one end of each of the flanges 30a, 30b, and a top surface 30e connecting end portions of the pair of side surfaces 30c, 30d. The top surface 30e of the hat-shaped member 30 is formed with a protrusion 50 protruding to the vehicle-exterior side in the X-direction, and the protrusion 50 is located at a middle portion in the Z-direction of the top surface 30e of the hat-shaped member 30. The protrusion 50 further has a pair of side surfaces 50a, 50b connecting with the top surface 30e of the hat-shaped member 30, and a top surface 50c connecting end portions of the pair of side surfaces 50a, 50b.

Note that in the case where the closed cross-sectional structure member is a bumper beam, the X-direction is the vehicle length direction, the Y-direction is the vehicle width direction, and the Z-direction is the vehicle height direction. Therefore, the vehicle-exterior side in the X-direction corresponds to the vehicle-exterior side in the vehicle length direction of the bumper beam, namely, the collision side in collision. Similarly, the vehicle-interior side in the X-direction corresponds to the vehicle-interior side in the vehicle length direction of the bumper beam, namely, the opposed collision side in collision. Besides, for example, in the case where the closed cross-sectional structure member is a side sill, the X-direction is the vehicle width direction, the Y-direction is the vehicle length direction, and the Z-direction is the vehicle height direction. Therefore, the collision side in collision in the case where the closed cross-sectional structure member is a side sill is the vehicle-exterior side in the X-direction, namely, the vehicle-exterior side in the vehicle width direction of the side sill. Similarly, the opposed collision side in collision in the case where the closed cross-sectional structure member is the side sill is the vehicle-interior side in the X-direction, namely, the vehicle-interior side in the vehicle width direction of the side sill. In consideration of the above point, it may also be said that the side surfaces 30c, 30d of the hat-shaped member 30 in the closed cross-sectional structure member such as the bumper beam 1, the side sill or the like are formed to extend from the one ends of the flanges 30a, 30b to the collision side in collision in the cross-section with the member longitudinal direction Y as a normal.

The reinforcement 40 is in a U-shape in the cross-section with the member longitudinal direction Y as a normal, and has a pair of side surfaces 40a, 40b in contact with the outer surface side of the side surfaces 30c, 30d of the hat-shaped member 30, and a top surface 40c connecting end portions of the pair of side surfaces 40a, 40b. The reinforcement 40 is provided in a manner to cover the top surface 30e of the hat-shaped member 30 and the protrusion 50.

The closing plate 25 and the hat-shaped member 30 are joined to each other by the flanges 30a, 30b of the hat-shaped member 30. The hat-shaped member 30 and the reinforcement 40 are joined to each other by the side surfaces 30c, 30d of the hat-shaped member 30 and the side surfaces 40a, 40b of the reinforcement 40. Further, the top surface 50c of the protrusion 50 of the hat-shaped member 30 is joined to the inner surface side of the top surface 40c of the reinforcement 40. In this embodiment, the inner member 2 and the outer member 3 are joined together in the above manner to constitute the hollow member 10.

In the first embodiment, the collision side wall part 11 is composed of the top surface 40c of the reinforcement 40 and the protrusion top surface 50c of the hat-shaped member 30, the opposed collision side wall part 12 is composed of the closing plate 25 and the flanges 30a, 30b of the hat-shaped member 30, the first side wall part 13 is composed of the side surface 40a of the reinforcement 40 and the side surface 30c of the hat-shaped member 30, and the second side wall part 14 is composed of the side surface 40b of the reinforcement 40 and the side surface 30d of the hat-shaped member 30. Further, in the first embodiment, the first inner wall part 15 and the second inner wall part 16 are the top surface 30e of the hat-shaped member 30, the third inner wall part 17 is the side surface 50a of the protrusion 50 of the hat-shaped member 30, and the fourth inner wall part 18 is the side surface 50b of the protrusion 50 of the hat-shaped member 30. Note that in this embodiment, a length a in the X-direction of the hollow member 10 (a distance from the closing plate 25 to the top surface 40c of the reinforcement 40) is larger than a width c of the reinforcement 40 (a distance between the side surfaces 40a and 40b).

The hollow member 10 in the first embodiment is formed with a closed cross-section A formed by the closing plate 25 and the hat-shaped member 30. In other words, one closed cross-section A is formed in a region surrounded by the opposed collision side wall part 12, a part of the first side wall part 13, the first inner wall part 15, the third inner wall part 17, a part of the collision side wall part 11, the fourth inner wall part 18, the second inner wall part 16, and the second side wall part 14. In other words, the closed cross-sectional structure member having the closed cross-section A is a structure in which only one protrusion 50 is provided at the top surface 30e of the hat-shaped member 30. The bumper beam 1 has three closed cross-sections A to C in total, that is, two closed cross-sections B, C made by partitioning a space between the hat-shaped member 30 and the reinforcement 40 by the protrusion 50 in addition to the closed cross-section A. Note that though the method of joining the members to each other is not particularly limited, the members are joined to each other, for example, by spot welding, laser welding and arc welding. The bumper beam 1 in the first embodiment is configured as above.

Figure 4:
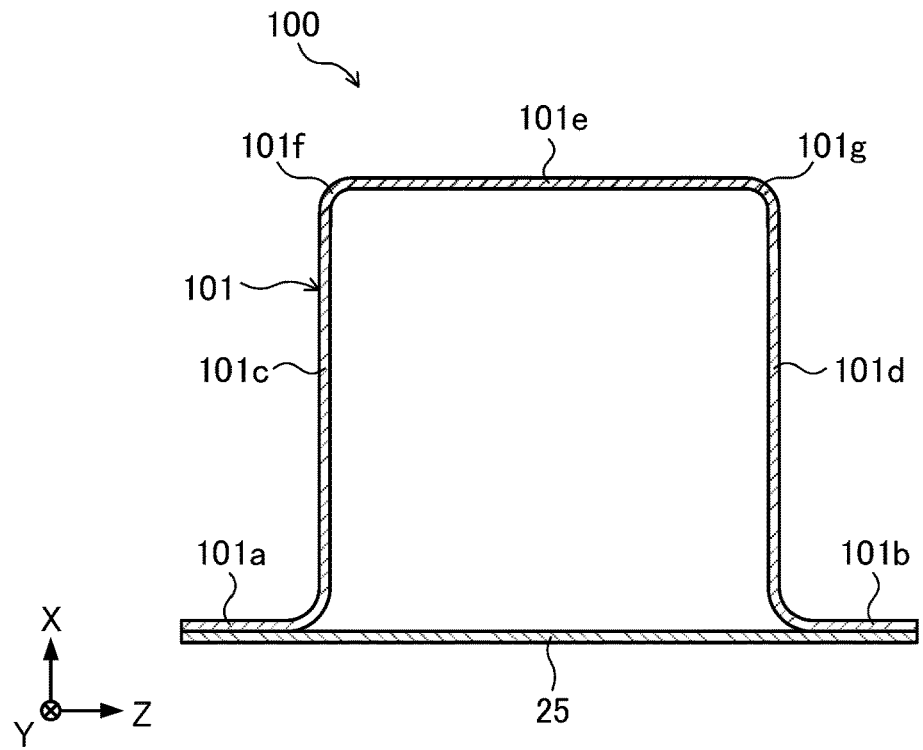
FIG. 4 is a cross-sectional view with a member longitudinal direction as a normal, illustrating a schematic configuration of a conventional bumper beam.

Here, in the case of a conventional bumper beam 100 composed of a closing plate 25 and a hat-shaped member 101 as illustrated in FIG. 4, when a load is inputted to a top surface 101e (collision surface) of the hat-shaped member 101 in collision, a compressive stress acts on the top surface 101e and ridge line parts 101f, 101g between the top surface 101e and a pair of side surfaces 101c, 101d, so that the side surfaces 101c, 101d receive moments for making them fall down to the outside. Therefore, because of the collapse of the top surface 101e and the ridge line parts 101f, 101g of the hat-shaped member 101, the buckling strength decreases. Further, because of the fall-down to the outside of the side surfaces 101c, 101d of the hat-shaped member 101, the load input to the side surfaces 101c, 101d decreases.

On the other hand, in the bumper beam 1 in the first embodiment illustrated in FIG. 3, when a load is inputted into the top surface 40c (collision surface) of the reinforcement 40 in collision, a compressive stress acts on the top surface 40c and ridge line parts 40d, 40e between the top surface 40c and the side surfaces 40a 40b of the reinforcement 40. A load is inputted also into the top surface 50c of the protrusion 50 joined to the top surface 40c of the reinforcement 40, so that a compressive stress acts also on the top surface 50c and the ridge line parts 50d, 50e between the top surface 50c and the side surfaces 50a, 50b of the protrusion 50. Due to these compressive stresses, the side surfaces 40a, 40b of the reinforcement 40 receive moments for making them fall down to the outside, whereas the side surfaces 30c, 30d of the hat-shaped member 30 receive moments for making them fall down to the inside. More specifically, the moments are generated in the side surfaces 30c, 30d of the hat-shaped member 30 and the side surfaces 40a, 40b of the reinforcement 40, the moments making them fall down to the sides opposite to each other, thereby making the side surfaces as the outer member 3 less likely to fall down. As a result of this, it is possible to receive a high load for a long time and increase the maximum load and the absorbed energy.

Besides, in the conventional bumper beam 1 illustrated in FIG. 4, the closing plate 25 is the inner member, and the hat-shaped member 101 is the outer member. In the bumper beam 1 in the first embodiment illustrated in FIG. 3, the outer member 3 is composed of the hat-shaped member 30 and the reinforcement 40. In other words, the side surfaces connecting with the collision surface (the top surface 40c of the reinforcement 40 in this embodiment) as the outer member 3 into which the load is inputted is composed of the side surfaces 30c, 30d of the hat-shaped member 30 and the side surfaces 40a, 40b of the reinforcement 40. Therefore, the bumper beam 1 is configured such that the lengths of the side surfaces (lengths in the X-direction) as the outer member 3 are the same as the lengths of the conventional structure in appearance but, actually, side surfaces small in length in the X-direction are arranged side by side. This enhances the surface rigidity of the side surfaces as the outer member 3 to make the side surfaces less likely to fall down. As a result of this, it is possible to receive a high load for a long time in collision and increase the maximum load and the absorbed energy.

Further, by forming the above-explained closed cross-section using the protrusion 50 on which the compressive stress acts in collision, the bending rigidity of the top surface 40c of the reinforcement 40 is improved to improve the maximum load. This can suppress buckling.

(1) The suppression of fall-down of the side surfaces 30c, 30d of the hat-shaped member 30 and (2) the application of the bending rigidity to the top surface 40c of the reinforcement 40 in the collision performance improving mechanism further effectively increase the maximum load and the absorbed energy when the cross-sectional dimension of the bumper beam 1 falls within a predetermined range.

Under such a condition that the length a in the X-direction of the hollow member 10 is constant, the surface rigidity of the side surfaces 50a, 50b of the protrusion 50 and the surface rigidity of the side surfaces 30c, 30d of the hat-shaped member 30 change depending on a height b of the protrusion 50 (the length in the X-direction from the top surface 30e of the hat-shaped member 30 to the top surface 50c of the protrusion 50). Based on later-explained examples, a ratio (b/a) between the height b of the protrusion 50 and the length a in the X-direction of the hollow member 10 is desirably 0.15 to 0.35. This can effectively increase the maximum load and the absorbed energy in collision. A more desirable lower limit of b/a is 0.17. A more desirable upper limit of b/a is 0.33.

Under such a condition that a width c of the reinforcement 40 is constant, the surface rigidity of the top surface 50c of the protrusion 50 changes depending on a width d of the protrusion 50 (a distance between the side surfaces 50a and 50b of the protrusion 50). Based on the later-explained examples, a smaller width d of the protrusion 50 is more desirable, but the width d of the protrusion 50 is desirably 10 mm or more in terms of sufficiently securing the welding margin for the spot welding, the laser welding and the arc welding.

Second Embodiment

Figure 5:
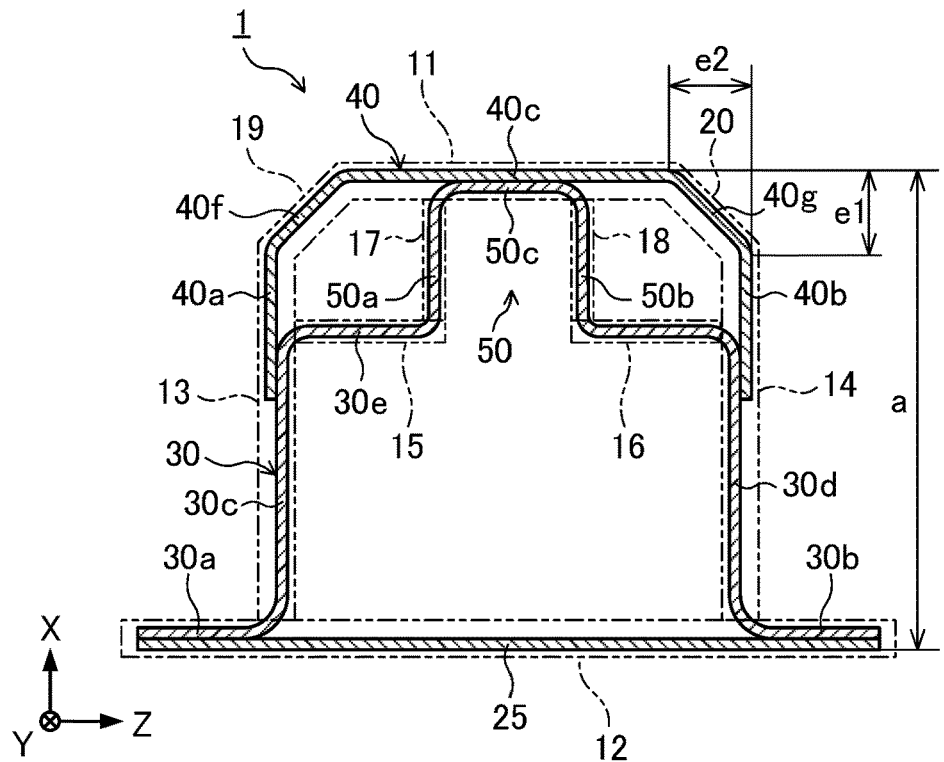
FIG. 5 is a cross-sectional view with a member longitudinal direction as a normal, illustrating a schematic configuration of a bumper beam according to a second embodiment of the present invention.

As illustrated in FIG. 5, a bumper beam 1 in a second embodiment has an inclined wall part 19 between the collision side wall part 11 and the first side wall part 13, and has an inclined wall part 20 between the collision side wall part 11 and the second side wall part 14. The inclined wall part 19 herein is a wall part having a flat surface not parallel to each of the collision side wall part 11 and the first side wall part 13 in the cross-section with the member longitudinal direction of the closed cross-sectional structure as a normal. Similarly, the inclined wall part 20 herein is a wall part having a flat surface not parallel to each of the collision side wall part 11 and the second side wall part 14 in the cross-section with the member longitudinal direction of the closed cross-sectional structure as a normal. The inclined wall parts 19, 20 of the bumper beam 1 in the second embodiment correspond to inclined surfaces 40f, 40g provided between the top surface 40c and the side surfaces 40a, 40b of the reinforcement 40. The provision of the inclined surfaces 40f, 40g as examples of the inclined wall parts 19, 20 as in the second embodiment can increase the absorbed energy in collision as illustrated in the later-explained examples.

In the bumper beam 1 in the second embodiment, the deformation mode of the side surfaces 30c, 30d of the hat-shaped member 30 can be controlled by changing a height e1 and a width e2 of the inclined wall parts 19, 20, namely, the height e1 and the width e2 of the inclined surfaces 40f, 40g of the reinforcement 40. Note that the height e1 of the inclined wall part 19 (20) herein is a length in the X-direction from the collision side wall part 11 to a boundary position between the inclined wall part 19 (20) and the side wall part 13 (14). Further, the width e2 of the inclined wall part 19 (20) herein is a length in the Z-direction from the side wall part 13(14) to a boundary position between the inclined wall part 19 (20) and the collision side wall part 11.

For example, in the case where the height e1 of the inclined surfaces 40f, 40g is 0 (namely, in the case where the inclined wall parts 19, 20 are not provided), the side surfaces 30c, 30d of the hat-shaped member 30 are in a deformation mode of falling down to the inside. This is because the loads inputted into the side surfaces 40a, 40b of the reinforcement 40 cause the moments for making the side surfaces 30c, 30d of the hat-shaped member 30 fall down to the inside because the side surfaces 40a, 40b of the reinforcement 40 are offset in the Z-direction with respect to the side surfaces 30c, 30d of the hat-shaped member 30. On the other hand, with an increase in the height e1 of the inclined surfaces 40f, 40g, a mode appears in which the side surfaces 30c, 30d of the hat-shaped member 30 fall down to the outside. This is because the loads inputted into the inclined surfaces 40f, 40g cause the moments for making the side surfaces 30c, 30d of the hat-shaped member 30 fall down to the outside and a larger height e1 of the inclined surfaces 40f, 40g increases the moments.

By changing the height e1 of the inclined surfaces 40f, 40g in the above manner, the side surfaces 30c, 30d of the hat-shaped member 30 can be shifted to the deformation mode in which they are less likely to fall down. Based on the later-explained examples, in terms of achieving both the load efficiency and the absorbed energy efficiency at high levels, a ratio (e1/a) between the height e1 of the inclined surfaces 40f, 40g and the length a in the X-direction of the hollow member 10 is desirably 0.05 to 0.20. A more desirable lower limit of e1/a is 0.08. A more desirable upper limit of e1/a is 0.17. Further, a ratio (e1/e2) between the height e1 and the width e2 of the inclined surfaces 40f, 40g is preferably 0.6 to 1.5, and more preferably 0.9 to 1.1.

Third Embodiment

Figure 6:
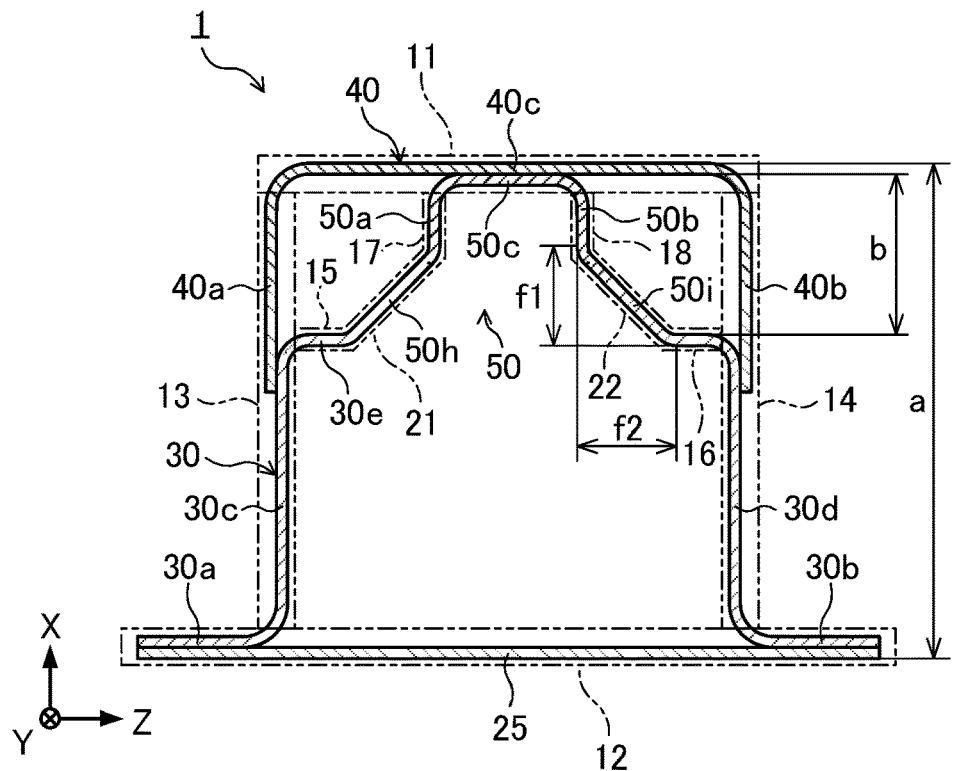
FIG. 6 is a cross-sectional view with a member longitudinal direction as a normal, illustrating a schematic configuration of a bumper beam according to a third embodiment of the present invention.

As illustrated in FIG. 6, a bumper beam 1 in a third embodiment has an inner inclined wall part 21 being an inclined wall part formed between the first inner wall part 15 and the third inner wall part 17, and an inner inclined wall part 22 being an inclined wall part formed between the second inner wall part 16 and the fourth inner wall part 18. The inner inclined wall part 21 herein is a wall part having a flat surface not parallel to each of the first inner wall part 15 and the third inner wall part 17 in the cross-section with the member longitudinal direction of the closed cross-sectional structure as a normal. Similarly, the inner inclined wall part 22 herein is a wall part having a flat surface not parallel to each of the second inner wall part 16 and the fourth inner wall part 18 in the cross-section with the member longitudinal direction of the closed cross-sectional structure as a normal. The inner inclined wall parts 21, 22 in the third embodiment correspond to inclined surfaces 50h, 50i provided between the top surface 30e of the hat-shaped member 30 and the side surfaces 50a, 50b of the protrusion 50. Note that a height f1 of the inner inclined wall part 21 (22) herein is a length in the X-direction from the inner wall part 15 (16) to a boundary position between the inner inclined wall part 21 (22) and the inner wall part 17 (18). Further, a width f2 of the inner inclined wall part 21 (22) herein is a length in the Z-direction from the inner wall part 17 (18) to a boundary position between the inner inclined wall part 21 (22) and the inner wall part 15 (16).

In the bumper beam 1 in the third embodiment, the deformation mode of the side surfaces 30c, 30d of the hat-shaped member 30 can be controlled by changing the height f1 and the width f2 of the inclined surfaces 50h, 50i. For example, in the case where the height f1 of the inclined surfaces 50h, 50i is 0 (namely, in the case where the inner inclined wall parts 21, 22 are not provided), the side surfaces 30c, 30d of the hat-shaped member 30 are brought into a deformation mode of falling down to the inside. This is because the loads inputted into the side surfaces 50a, 50b of the protrusion 50 cause the moments for making the side surfaces 30c, 30d of the hat-shaped member 30 fall down to the inside because the side surfaces 50a, 50b of the protrusion 50 are offset in the Z-direction with respect to the side surfaces 30c, 30d of the hat-shaped member 30. On the other hand, with an increase in the height f1 of the inclined surfaces 50h, 50i, a mode appears which makes the side surfaces 30c, 30d of the hat-shaped member 30 fall down to the outside. This is because the loads inputted into the inclined surfaces 50h, 50i cause the moments for making the side surfaces 30c, 30d of the hat-shaped member 30 fall down to the outside and a larger height f1 of the inclined surfaces 50h, 50i increases the moments.

By changing the height f1 of the inclined surfaces 50h, 50i in the above manner, the side surfaces 30c, 30d of the hat-shaped member 30 can be shifted to the deformation mode in which they are less likely to fall down. Based on the later-explained examples, in terms of achieving both the load efficiency and the absorbed energy efficiency at high levels, a ratio (f1/a) between the height f1 of the inclined surfaces 50h, 50i and the length a in the X-direction of the hollow member 10 is desirably 0.05 to 0.20. A more desirable lower limit of f1/a is 0.08. A more desirable upper limit of f1/a is 0.17. Further, in terms of achieving both the load efficiency and the absorbed energy efficiency at high levels, the height f1 is desirably less than the height b of the protrusion 50. Further, a ratio (f1/f2) between the height f1 and the width f2 of the inclined surfaces 50h, 50i is preferably 0.6 to 1.5 and more preferably 0.9 to 1.1.

Fourth Embodiment

Figure 7:
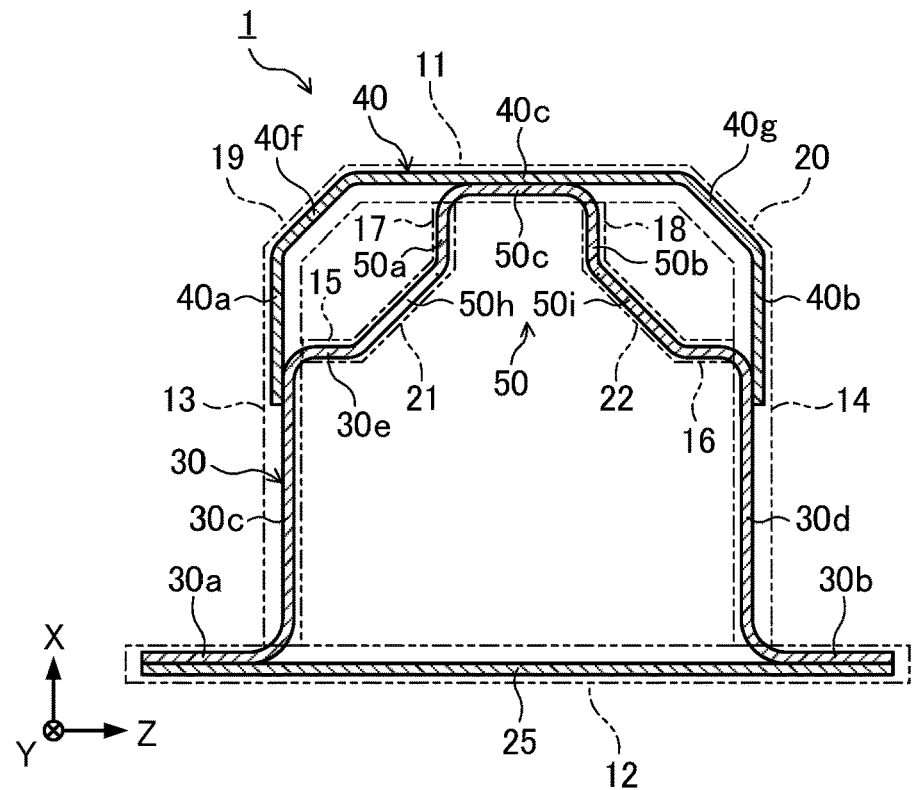
FIG. 7 is a cross-sectional view with a member longitudinal direction as a normal, illustrating a schematic configuration of a bumper beam according to a fourth embodiment of the present invention.

As illustrated in FIG. 7, a bumper beam 1 in a fourth embodiment has a structure made by combining the bumper beam 1 in the second embodiment illustrated in FIG. 5 and the bumper beam 1 in the third embodiment illustrated in FIG. 6, in which the reinforcement 40 is formed with the inclined surfaces 40f, 40g and the protrusion 50 is formed with the inclined surfaces 50h, 50i. In other words, the bumper beam 1 in the fourth embodiment has the inclined wall part 19 between the collision side wall part 11 and the first side wall part 13, has the inclined wall part 20 between the collision side wall part 11 and the second side wall part 14, has the inner inclined wall part 21 between the first inner wall part 15 and the third inner wall part 17, and has the inner inclined wall part 22 between the second inner wall part 16 and the fourth inner wall part 18. The bumper beam 1 in the above structure can further increase the absorbed energy in collision.

Embodiments of the present invention have been explained above, but the present invention is not limited to the embodiments. It should be understood that various changes and modifications are readily apparent to those skilled in the art within the scope of the technical spirit as set forth in claims, and those should also be covered by the technical scope of the present invention.

Figure 8:
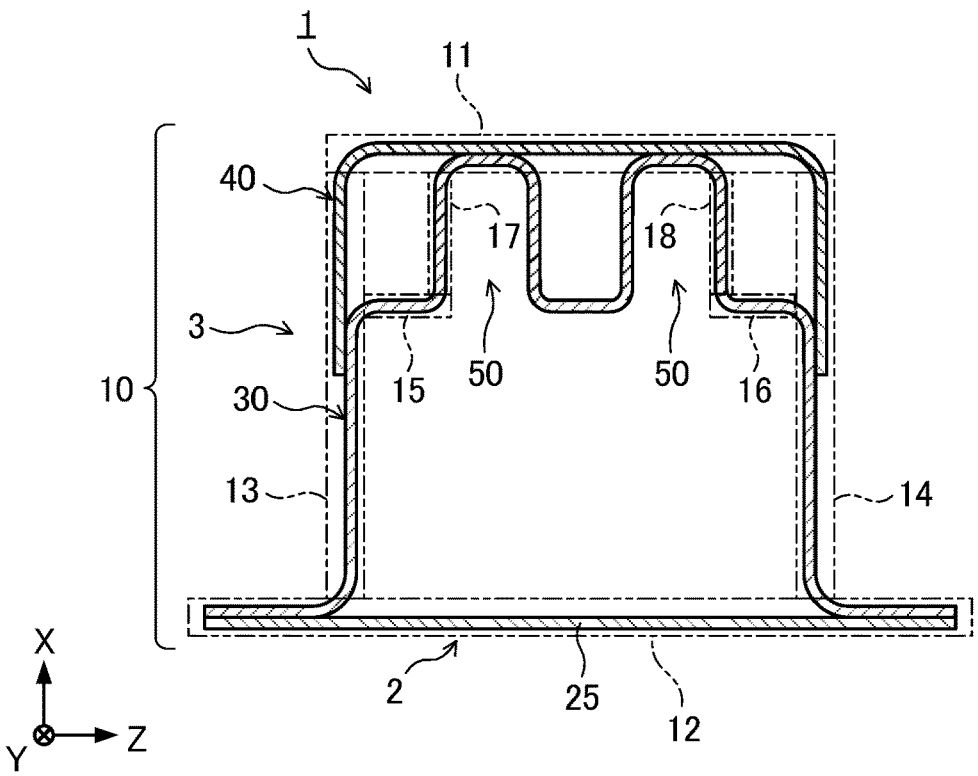
FIG. 8 is a view illustrating an example of a bumper beam in the case where a plurality of protrusions is provided.

For example, as illustrated in FIG. 8, a plurality of protrusions 50 may be provided and, in this case, the absorbed energy in collision can further be increased. In an example illustrated in FIG. 8, two protrusions 50 are provided and, in this case, the hollow member 10 is composed of four closed cross-sections. In other words, the hollow member 10 is composed of three or more closed cross-sections according to the number of protrusions 50. Note that, in the example illustrated in FIG. 8, two closed cross-sections are formed in a region surrounded by the opposed collision side wall part 12, a part of the first side wall part 13, the first inner wall part 15, the third inner wall part 17, a part of the collision side wall part 11, the fourth inner wall part 18, the second inner wall part 16, and the second side wall part 14. In terms of achieving both the improvement in absorbed energy in collision and reduction in weight at high levels, it is desirable that only one protrusion 50 is formed. In other words, it is desirable that one closed cross-sectional space is formed in the region surrounded by the opposed collision side wall part 12, a part of the first side wall part 13, the first inner wall part 15, the third inner wall part 17, a part of the collision side wall part 11, the fourth inner wall part 18, the second inner wall part 16, and the second side wall part 14.

Figure 9:
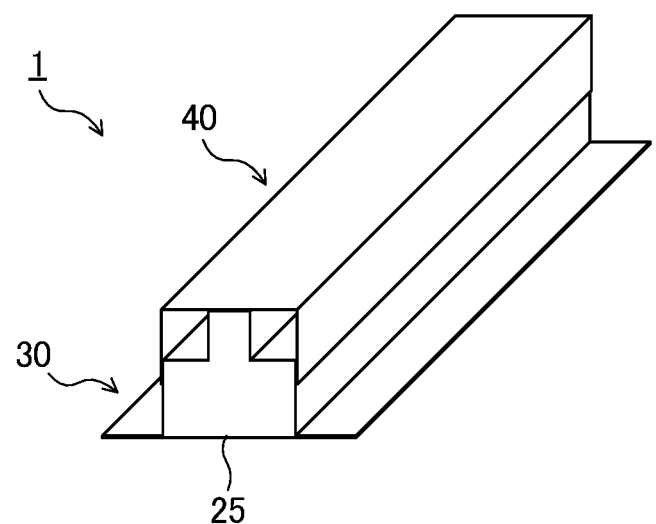
FIG. 9 is a view illustrating an example of a shape of a reinforcement.
Figure 10:
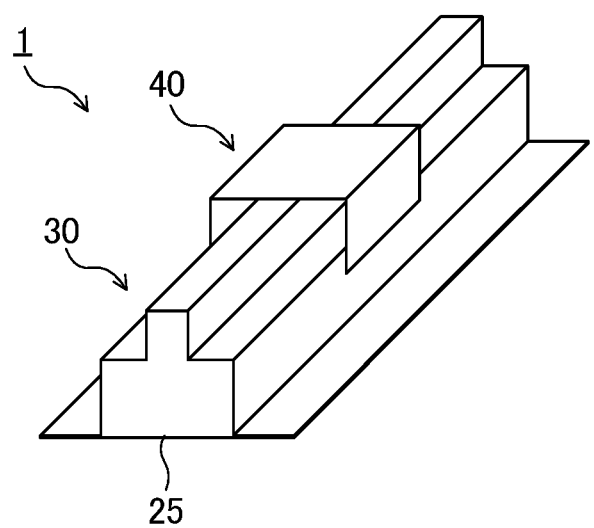
FIG. 10 is a view illustrating an example of the shape of the reinforcement.

Further, the reinforcement 40 may be provided over the entire length in the longitudinal direction of the hat-shaped member 30 as illustrated in FIG. 9 or may be only partially provided at an input part of the collision load and its periphery as illustrated in FIG. 10 as long as the input part of the collision load can be specified to some extent based on the shape, the attachment position or the like of the bumper beam 1. In the case where the reinforcement 40 is partially provided in the above manner, the absorbed energy in collision can be sufficiently increased and the reduction in weight can be achieved.

Besides, the bumper beam 1 is composed of three components such as the closing plate 25, the hat-shaped member 30, and the reinforcement 40 in the above embodiments, but the closed cross-sectional structure member according to the present invention is not limited to those explained in the embodiments. For example, the closed cross-sectional structure member may be a member illustrated in each of FIG. 11 to FIG. 15. The closed cross-sectional structure member illustrated in each of FIG. 11 to FIG. 15 may be integrally molded, for example, by extrusion molding, or may be constituted by joining a plurality of members to each other by welding or the like.

Also in the above closed cross-sectional structure member, the hollow member 10 includes the collision side wall part 11, the opposed collision side wall part 12 opposing the collision side wall part 11, and the pair of first side wall part 13 and second side wall part 14 connecting with the end portions of the collision side wall part 11 and the end portions of the opposed collision side wall part 12 as explained in the above embodiments. Further, the hollow member 10 has the first inner wall part 15 extending from the first side wall part 13 to the inside of the hollow member 10, the second inner wall part 16 extending from the second side wall part 14 to the inside of the hollow member 10, the third inner wall part 17 connecting with the first inner wall part 15 and the collision side wall part 11, and the fourth inner wall part 18 connecting with the second inner wall part 16 and the collision side wall part 11.

Figure 11:
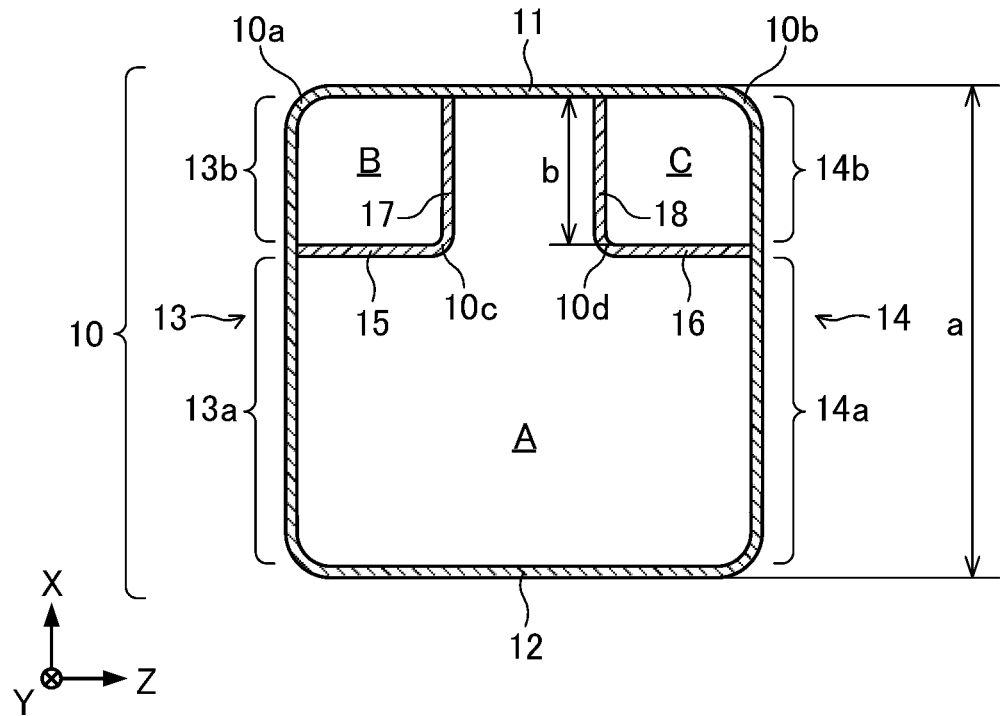
FIG. 11 is a view illustrating an example of a closed cross-sectional structure member according to the present invention.

In an example illustrated in FIG. 11, the first inner wall part 15 is parallel to the collision side wall part 11, the second inner wall part 16 is parallel to the collision side wall part 11, and the positions in the X-direction of the first inner wall part 15 and the second inner wall part 16 are the same. Further, in the example illustrated in FIG. 11, the third inner wall part 17 is vertical to the collision side wall part 11, and the fourth inner wall part 18 is vertical to the collision side wall part 11. Further, in the example illustrated in FIG. 11, one closed cross-section A is formed in a region surrounded by the opposed collision side wall part 12, a part of the first side wall part 13, the first inner wall part 15, the third inner wall part 17, a part of the collision side wall part 11, the fourth inner wall part 18, the second inner wall part 16, and the second side wall part 14. Further, since the closed cross-section A is formed in the hollow member 10, the hollow member 10 is formed with a closed cross-section B surrounded by the first side wall part 13, the collision side wall part 11, the third inner wall part 17, and the first inner wall part 15. Similarly, the hollow member 10 is formed with a closed cross-section C surrounded by the second side wall part 14, the collision side wall part 11, the fourth inner wall part 18, and the second inner wall part 16.

In the case of the closed cross-sectional structure member in the example illustrated in FIG. 11, when a load is inputted into the collision side wall part 11 in collision, a compressive stress acts on the collision side wall part 11, a ridge line part 10a between the collision side wall part 11 and the first side wall part 13, and a ridge line part 10b between the collision side wall part 11 and the second side wall part 14. In this event, a moment acts on a portion 13b (a portion located closer to the collision side than the first inner wall part 15) of the first side wall part 13, the moment making the portion 13b fall down to the outside, since the first inner wall part 15 is in a state of connecting with the first side wall part 13 and the third inner wall part 17 is in a state of connecting with the collision side wall part 11. Similarly, a moment acts on a portion 14b (a portion located closer to the collision side than the second inner wall part 16) of the second side wall part 14, the moment making the portion 14b fall down to the outside, since the second inner wall part 16 is in a state of connecting with the second side wall part 14 and the fourth inner wall part 18 is in a state of connecting with the collision side wall part 11. On the other hand, a moment acts on a portion 13a located closer to the opposed collision side than the first inner wall part 15 of the first side wall part 13, the moment making the portion 13a fall down to the inside. Similarly, a moment acts on a portion 14a located closer to the opposed collision side than the second inner wall part 16 of the second side wall part 14, the moment making the portion 14a fall down to the inside.

Accordingly, the moments act on the portion 13a and the portion 13b of the first side wall part 13, the moments making them fall down to the sides opposite to each other, thereby making the first side wall part 13 less likely to fall down. Similarly, the moments act on the portion 14a and the portion 14b of the second side wall part 14, the moments making them fall down to the sides opposite to each other, thereby making the second side wall part 14 less likely to fall down. As a result of this, it is possible to receive a high load for a longer time in collision and increase the maximum load and the absorbed energy.

Under such a condition that the length a from the opposed collision side wall part 12 to the collision side wall part 11 is constant, the ratio (b/a) between the height b of each of the third inner wall part 17 and the fourth inner wall part 18 and the length a is desirably 0.15 to 0.35. This can effectively increase the maximum load and the absorbed energy in collision. A more desirable lower limit of b/a is 0.17. A more desirable upper limit of b/a is 0.33.

Figure 12:
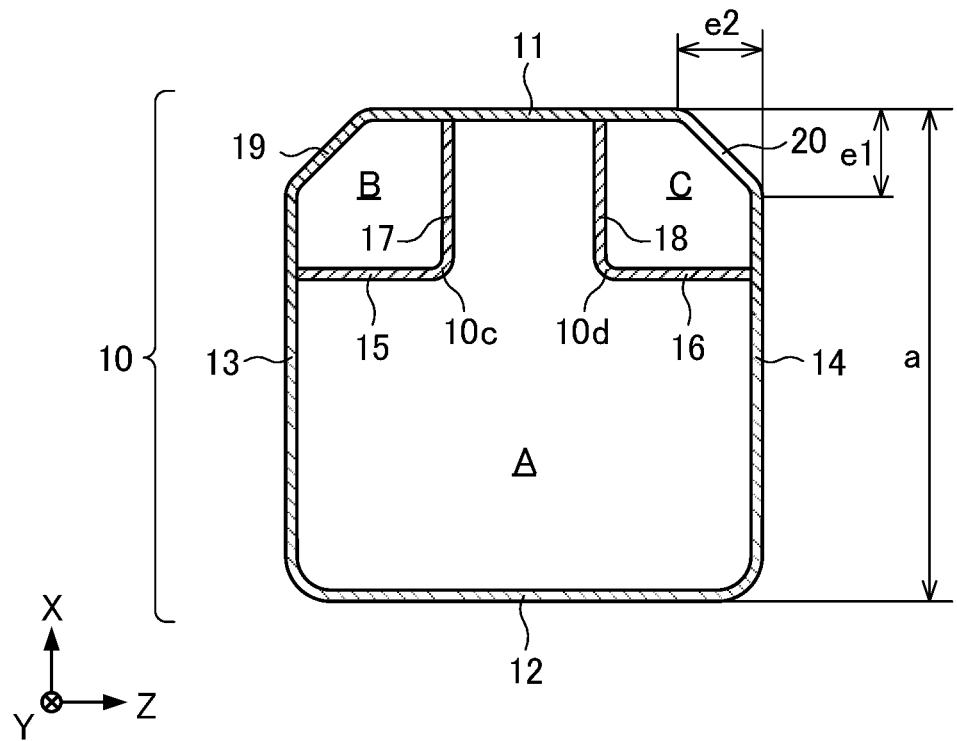
FIG. 12 is a view illustrating an example of the closed cross-sectional structure member according to the present invention.

In an example illustrated in FIG. 12, the inclined wall part 19 is formed between the collision side wall part 11 and the first side wall part 13, and the inclined wall part 20 is formed between the collision side wall part 11 and the second side wall part 14. In this case, similarly to the example illustrated in FIG. 5, the ratio (e1/a) between the height e1 of the inclined wall parts 19, 20 and the length a from the opposed collision side wall part 12 to the collision side wall part 11 is desirably 0.05 to 0.20. A more desirable lower limit of e1/a is 0.08. A more desirable upper limit of e1/a is 0.17. Further, the ratio (e1/e2) between the height e1 and the width e2 of the inclined wall parts 19, 20 is preferably 0.6 to 1.5, and more preferably 0.9 to 1.1.

Figure 13:
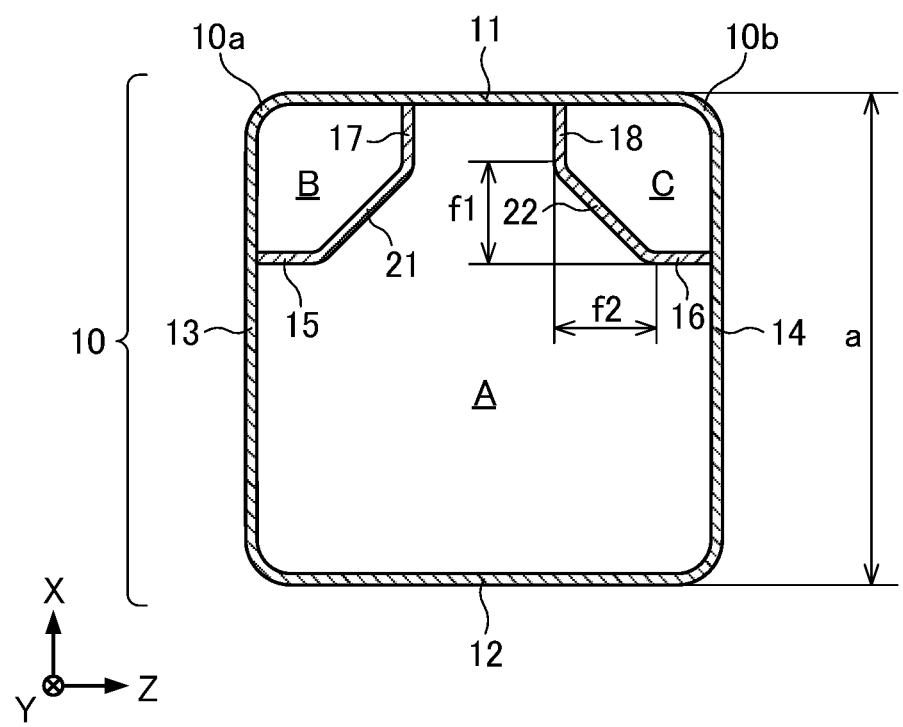
FIG. 13 is a view illustrating an example of the closed cross-sectional structure member according to the present invention.

In an example illustrated in FIG. 13, the inner inclined wall part 21 is formed between the first inner wall part 15 and the third inner wall part 17, and the inner inclined wall part 22 is formed between the second inner wall part 16 and the fourth inner wall part 18. In this case, similarly to the example illustrated in FIG. 6, the ratio (f1/a) between the height f1 of the inner inclined wall parts 21, 22 and the length a from the opposed collision side wall part 12 to the collision side wall part 11 is desirably 0.05 to 0.20. A more desirable lower limit of f1/a is 0.08. A more desirable upper limit of f1/a is 0.17. Further, the ratio (f1/f2) between the height f1 and the width f2 of the inner inclined wall parts 21, 22 is preferably 0.6 to 1.5, and more preferably 0.9 to 1.1.

Further, the closed cross-sectional structure member may be made by combining the structure having the inclined wall part 19 and the inclined wall part 20 illustrated in FIG. 12 and the structure having the inner inclined wall part 21 and the inner inclined wall part 22 illustrated in FIG. 13.

Figure 14:
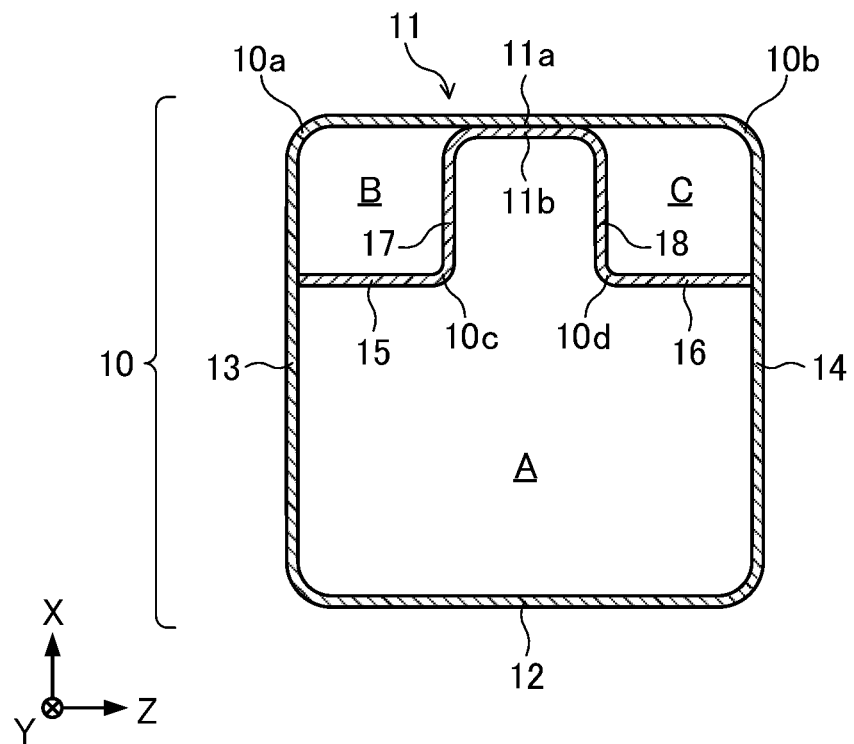
FIG. 14 is a view illustrating an example of the closed cross-sectional structure member according to the present invention.

In an example illustrated in FIG. 14, the collision side wall part 11 has a first collision side wall part 11a connecting with a collision side end portion of the first side wall part 13 and a collision side end portion of the second side wall part 14, and a second collision side wall part 11b connecting with the third inner wall part 17 and the fourth inner wall part 18. The first collision side wall part 11a and the second collision side wall part 11b are in a state of being joined to each other, for example, by welding or integrally molding. The provision of the second collision side wall part 11b can enhance the bending rigidity of the first collision side wall part 11a and further increase the absorbed energy in collision. Note that the second collision side wall part 11b corresponds to the protrusion top surface 50c of the hat-shaped member 30 in the example illustrated in FIG. 3.

Figure 15:
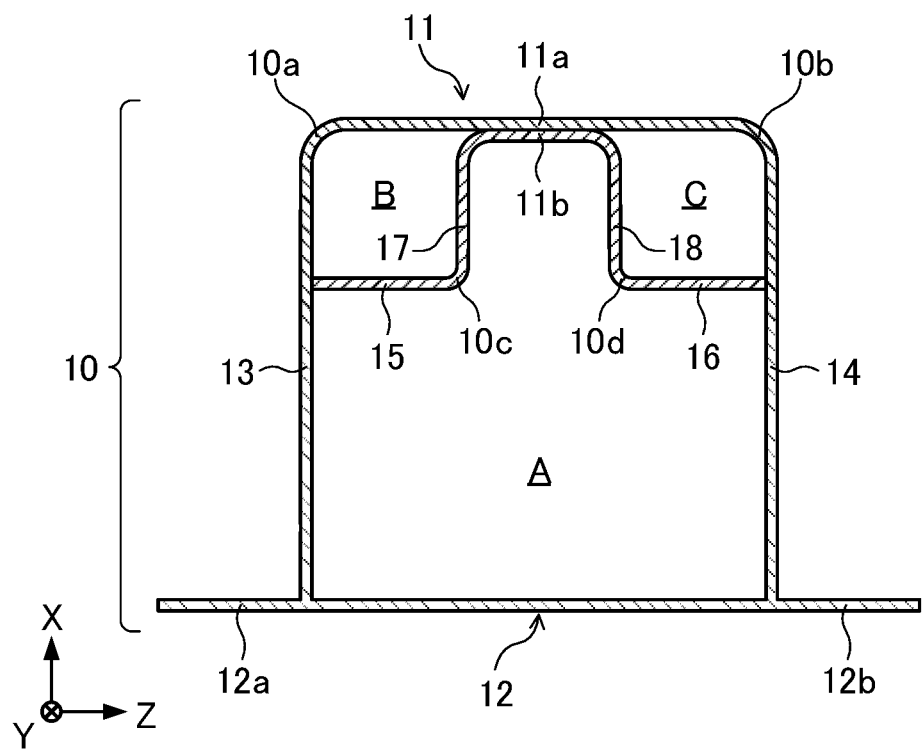
FIG. 15 is a view illustrating an example of the closed cross-sectional structure member according to the present invention.

In an example illustrated in FIG. 15, one end portion 12a of the opposed collision side wall part 12 projects from the first side wall part 13 to the outside of the hollow member 10, and another end portion 12b thereof projects from the second side wall part 14 to the outside of the hollow member 10, in the cross-section with the member longitudinal direction Y as a normal.

Also in the examples illustrated in FIG. 14 and FIG. 15, the inclined wall parts 19, 20 as illustrated in FIG. 12 may be provided, or the inner inclined wall parts 21, 22 as illustrated in FIG. 13 may be provided. Further, all of the inclined wall parts 19 to 22 may be provided.

EXAMPLES

Analysis models of the conventional bumper beams and the bumper beams according to the present invention were produced, and load bearing evaluation simulation of the bumper beams assuming a pole front collision was carried out.

Figure 16:
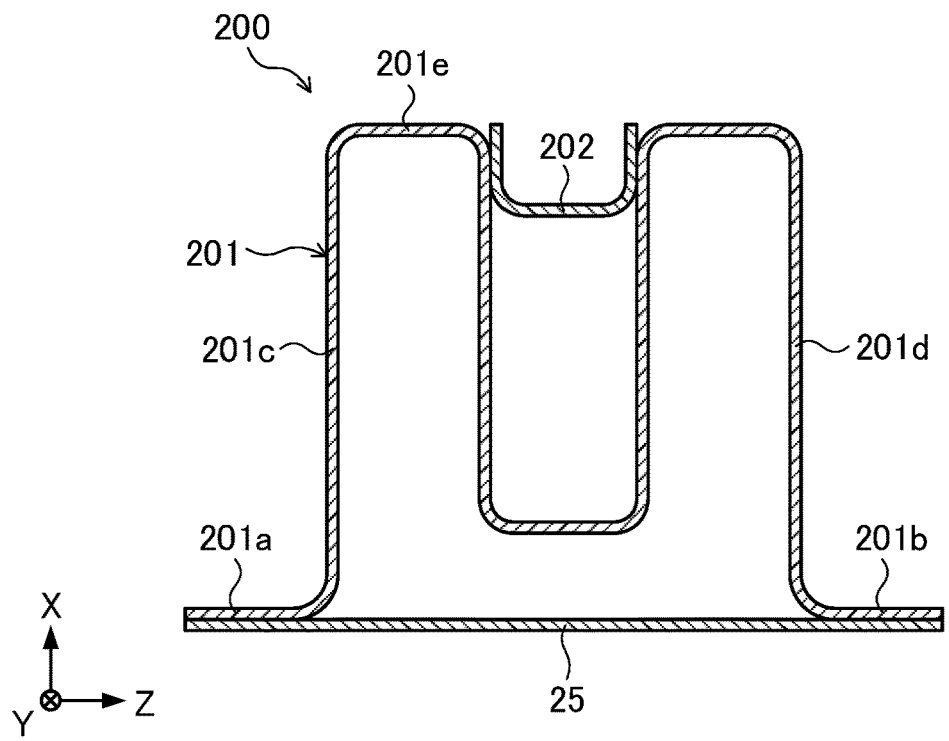
FIG. 16 is a cross-sectional view with a member longitudinal direction as a normal, illustrating a schematic configuration of a bumper beam in a comparative example.
Figure 17:
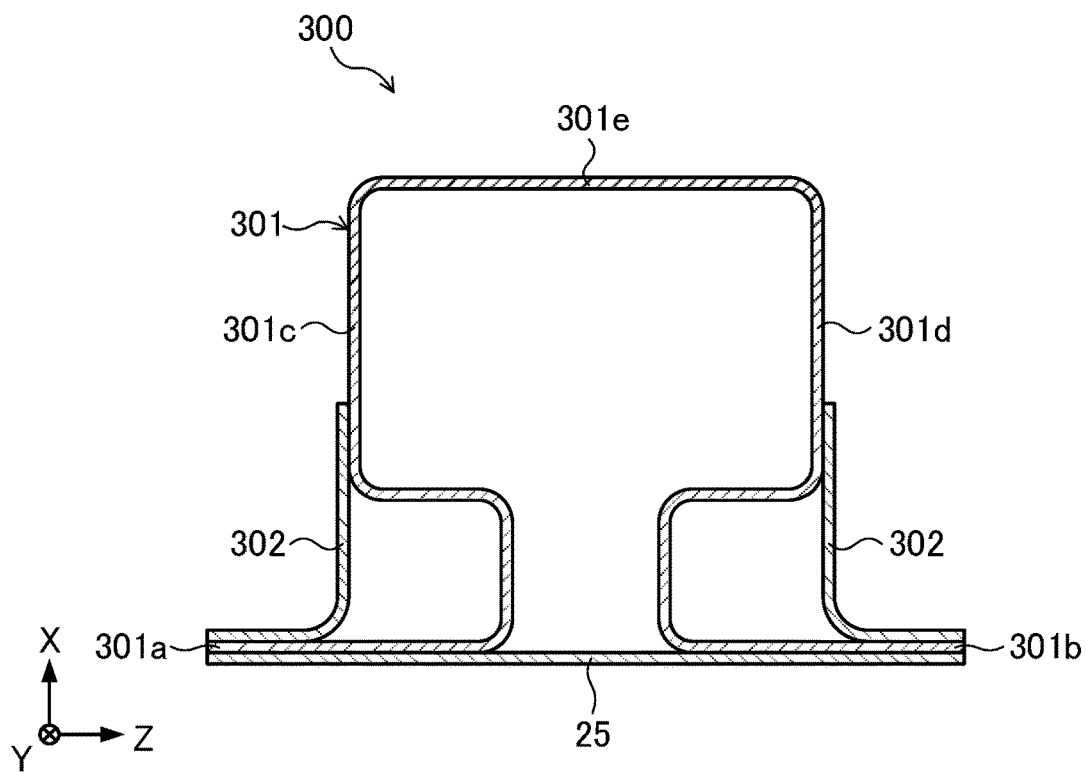
FIG. 17 is a cross-sectional view with a member longitudinal direction as a normal, illustrating a schematic configuration of a bumper beam in a comparative example.

The analysis models of the conventional bumper beams are the structure 100 (Comparative Example 1) illustrated in FIG. 4, a structure 200 (Comparative Example 2) illustrated in FIG. 16, and a structure 300 (Comparative Example 3) illustrated in FIG. 17. The analysis model in Comparative Example 1 is a structure composed of the closing plate 25 and the hat-shaped member 101. The analysis model in Comparative Example 2 is made by correcting the closed cross-sectional structure member in Patent Document 1 to a structure in consideration of productivity, and is a structure in which a recess is provided at the middle of a top surface 201e of a hat-shaped member 201 and a reinforcement 202 is provided in the recess. The analysis model in Comparative Example 3 is made by correcting the closed cross-sectional structure member in Patent Document 2 to a structure in consideration of productivity, and is a structure in which a portion of a hat-shaped member 301 is narrowed in width between a pair of side surfaces 301c, 301d thereof and reinforcements 302 are provided in a manner to cover the portion narrowed in width.

The analysis models of the bumper beams according to the present invention are structures (Examples 1 to 6) corresponding to the first embodiment illustrated in FIG. 3, structures (Examples 7 to 9) corresponding to the second embodiment illustrated in FIG. 5, structures (Examples 10 to 12) corresponding to the third embodiment illustrated in FIG. 6, and structures (Examples 13 to 15) corresponding to the fourth embodiment illustrated in FIG. 7. The length a in the X-direction of the hollow member is 60 mm and the width c is 60 mm which are common to the analysis models in Examples 1 to 16, and b/a being the aforementioned ratio falls within a range of ½ or less and d/c falls within a range of ⅚ or less as illustrated in the following Table 1. Further, in the analysis models provided with the inclined wall parts, both (height e1 of inclined wall part)/a and (height f1 of inclined wall part)/a are ¼ or less. The length in the member longitudinal direction of each of the bumper beams was set to 1000 mm.

Figure 18:
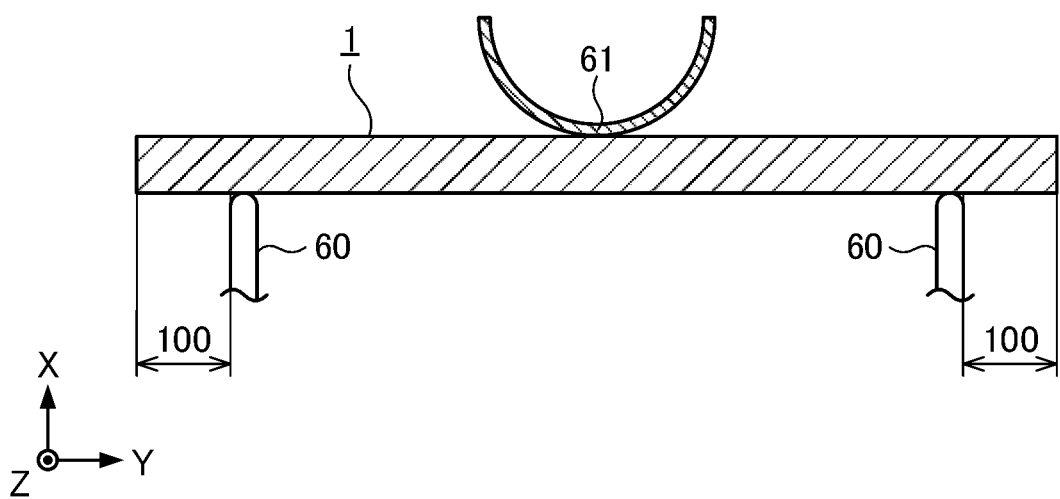
FIG. 18 is a view illustrating collision analysis conditions.

In the load bearing evaluation simulation, supporting poles 60 having a diameter of 30 mm are placed at positions inside by 100 mm from both end portions of the bumper beam 1 toward the middle in the vehicle width direction Y as illustrated in FIG. 18. Further, a pole 61 having a diameter of 254 mm is placed at the middle in the vehicle width direction Y, and is moved by 200 mm in parallel to the vehicle length direction X. An indentation amount (stroke amount) of the pole and an input load at that time were recorded, and the maximum load, namely, the proof stress and the absorbed energy were measured. Note that energy absorbed by the bumper beam during the time when the indentation amount of the pole is 0 to 100 mm is regarded as the absorbed energy.

Table 1 lists the material strength, the plate thickness, the dimensional parameters (b/a, d/c, e1/a, e2/a, f1/a, f2/a) of components in Comparative Examples 1 to 3 and Examples 1 to 16, the load efficiency obtained by dividing the maximum load of the bumper beam in the simulation by mass, and the absorbed energy efficiency obtained by dividing the absorbed energy by mass. Note that the plate thicknesses and the strengths of the components constituting the bumper beams are all equal.

TABLE 1

| SHAPE | MATERIAL STRENGTH (MPa) | PLATE THICKNESS (mm) | b/a | d/c | e1/a | e2/a | e1/e2 | f1/a | f2/a | f1/f2 | MAXIMUM LOAD/MASS (kN/kg) | ABSORBED ENERGY/MASS (J/kg) |
|---|---|---|---|---|---|---|---|---|---|---|---|---|
| COMPARATIVE EXAMPLE 1 | 1180 | 1.6 | — | — | — | — | — | — | — | — | 7.37 | 422.80 |
| COMPARATIVE EXAMPLE 2 | 1180 | 1.6 | — | — | — | — | — | — | — | — | 12.51 | 877.76 |
| COMPARATIVE EXAMPLE 3 | 1180 | 1.6 | — | — | — | — | — | — | — | — | 7.83 | 534.04 |
| EXAMPLE 1 | 1180 | 1.6 | 0.33 | 0.33 | — | — | — | — | — | — | 15.19 | 826.19 |
| EXAMPLE 2 | 1180 | 1.6 | 0.17 | 0.33 | — | — | — | — | — | — | 16.01 | 799.62 |
| EXAMPLE 3 | 1180 | 1.6 | 0.50 | 0.33 | — | — | — | — | — | — | 13.00 | 707.05 |
| EXAMPLE 4 | 1180 | 1.6 | 0.33 | 0.17 | — | — | — | — | — | — | 14.91 | 870.13 |
| EXAMPLE 5 | 1180 | 1.6 | 0.33 | 0.50 | — | — | — | — | — | — | 14.42 | 781.87 |
| EXAMPLE 6 | 1180 | 1.6 | 0.33 | 0.67 | — | — | — | — | — | — | 14.26 | 777.61 |
| EXAMPLE 7 | 1180 | 1.6 | 0.33 | 0.33 | 0.08 | 0.08 | 1.0 | — | — | — | 15.41 | 920.68 |
| EXAMPLE 8 | 1180 | 1.6 | 0.33 | 0.33 | 0.17 | 0.17 | 1.0 | — | — | — | 14.49 | 979.17 |
| EXAMPLE 9 | 1180 | 1.6 | 0.33 | 0.33 | 0.25 | 0.25 | 1.0 | — | — | — | 13.77 | 863.91 |
| EXAMPLE 10 | 1180 | 1.6 | 0.33 | 0.33 | — | — | — | 0.08 | 0.08 | 1.0 | 15.44 | 841.27 |
| EXAMPLE 11 | 1180 | 1.6 | 0.33 | 0.33 | — | — | — | 0.17 | 0.17 | 1.0 | 15.70 | 889.18 |
| EXAMPLE 12 | 1180 | 1.6 | 0.33 | 0.33 | — | — | — | 0.25 | 0.25 | 1.0 | 14.77 | 748.73 |
| EXAMPLE 13 | 1180 | 1.6 | 0.33 | 0.33 | 0.08 | 0.08 | 1.0 | 0.08 | 0.08 | 1.0 | 15.43 | 926.76 |
| EXAMPLE 14 | 1180 | 1.6 | 0.33 | 0.33 | 0.08 | 0.08 | 1.0 | 0.17 | 0.17 | 1.0 | 14.56 | 1000.18 |
| EXAMPLE 15 | 1180 | 1.6 | 0.33 | 0.33 | 0.08 | 0.08 | 1.0 | 0.25 | 0.25 | 1.0 | 13.85 | 987.57 |
| EXAMPLE 16 | 1180 | 1.6 | 0.33 | 0.33 | 0.17 | 0.25 | 0.68 | — | — | — | 13.20 | 539.00 |

Figure 19:
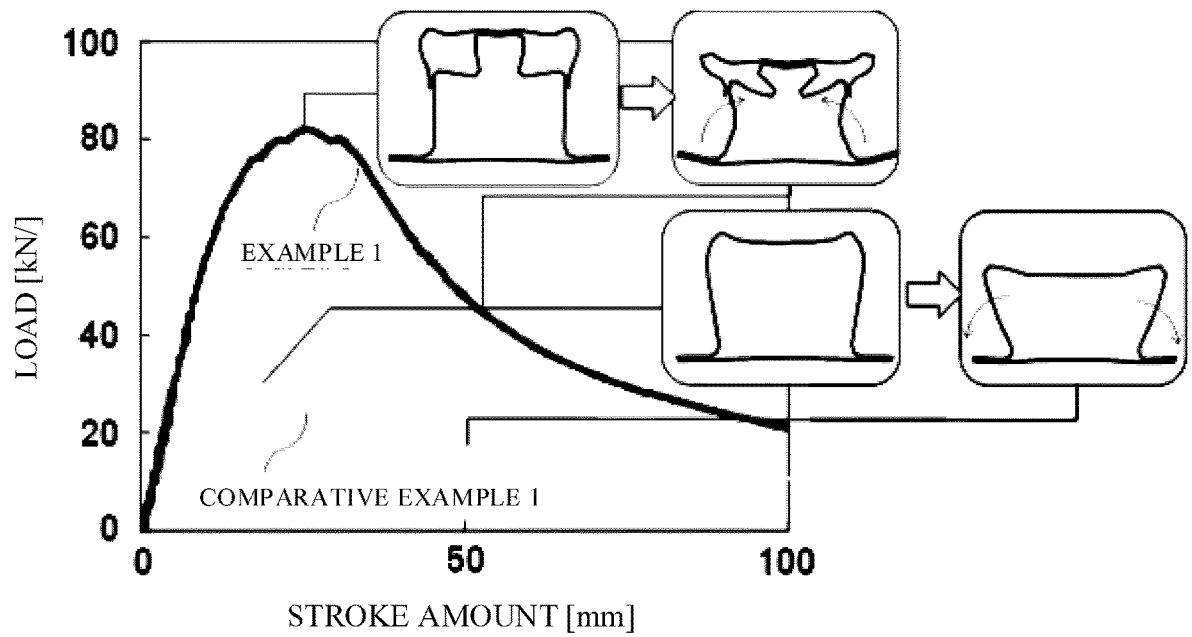
FIG. 19 is a load-stroke diagram in a simulation of a conventional structure and a structure according to the present invention.

FIG. 19 illustrates a load-stroke diagram of Comparative Example 1 and Example 1. Under both conditions, the initial load rises, the maximum load is reached, and then the load decreases and remains at low levels. In Comparative Example 1, at the time when the initial load rises, the top surface (collision surface) of the hat-shaped member bends to the inside and the pair of side surfaces begin to bend to the outside. Then, after the maximum load is reached, buckling in the vehicle height direction begins and the pair of side surfaces of the hat-shaped member begin to fall down to the outside. On the other hand, in Example 1, at the time when the initial load rises, only the reinforcement is deformed, and after the maximum load is reached, buckling in the vehicle height direction begins and the pair of side surfaces of the hat-shaped member begin to fall down to the inside. FIG. 19 further indicates that the maximum load and the absorbed energy are higher in Example 1 than in Comparative Example 1. These results showed that the bumper beam according to the present invention has higher proof stress and higher absorbed energy performance than those of the conventional bumper beam.

Next, the influence of the cross-sectional dimension of the bumper beam according to the present invention exerted on the collision performance was investigated. First, the desirable dimension of the height b of the protrusion was investigated by comparing Examples 1 to 3. The load efficiency is best in the case where b/a is 0.17 (Example 2), and the absorbed energy efficiency is highest in the case where b/a is 0.33 (Example 1). These results showed that b/a is desirably 0.15 to 0.35.

Next, the desirable dimension of the width d of the protrusion was investigated by comparing Examples 1, 4 to 6. It was shown that the load efficiency and the absorbed energy efficiency further increase with a smaller d/c. In this simulation, such a result that d/c is desirably 0.20 or less in terms of achieving both the load efficiency and the absorbed energy efficiency at high levels was obtained, but the desirable d/c varies by a change in the width c of the reinforcement.

Next, the effect of the presence or absence of the inclined wall parts of the reinforcement was confirmed by comparing Examples 1, 7 to 9. Comparison of Examples 1, 7 to 9 in Table 1 shows that the absorbed energy efficiency is higher in Examples 7 to 9. These results showed that the collision performance is improved by the provision of the inclined wall parts at the reinforcement. Further, the load efficiency is best in the case where e1/a is 0.08 (Example 7), and the absorbed energy efficiency is highest in the case where e1/a is 0.17 (Example 8). These results showed that e1/a is desirably 0.05 to 0.20 in terms of achieving both the load efficiency and the absorbed energy efficiency at high levels.

Next, the effect of the presence or absence of the inclined wall parts between the pair side surfaces of the protrusion and the top surface of the hat-shaped member was confirmed by comparing Examples 1, 10 to 12. Comparison of Examples 1, 10 to 12 in Table 1 showed that there was a cross-sectional dimension providing high load efficiency and absorbed energy efficiency depending on the height of the inclined wall parts. Further, when f1/a is 0.08 (Examples 10) to 0.17 (Example 11), the effects of improving the load efficiency and the absorbed energy efficiency are seen. These results showed that f1/a is desirably 0.05 to 020 in terms of achieving both the load efficiency and the absorbed energy efficiency at high levels.

Next, the synergistic effect of the inclined wall parts of the reinforcement and the inclined wall parts between the pair of side surfaces of the protrusion and the top surface of the hat-shaped member was confirmed by comparing Examples 1, 13 to 15. The influence exerted by f1/a was confirmed with e1/a fixed to 0.08. The absorbed energy efficiency exceeded that in Example 1 under any condition, and the maximum value was exhibited when f1/a was 0.17 (Example 14). These results showed that a synergistic effect is produced by the inclined wall parts of the reinforcement and the inclined wall parts between the pair of side surfaces of the protrusion and the top surface of the hat-shaped member as in FIG. 7 to further improve the collision performance.

Note that the analysis model in Example 16 is a model of a structure in which the height e1 and the width e2 of the inner inclined wall part of the reinforcement are different, and the width e2 is larger than the height e1. As listed in Table 1, the load efficiency and the absorbed energy efficiency are improved also in Example 16 with respect to Comparative Example 1.

Figure 20:
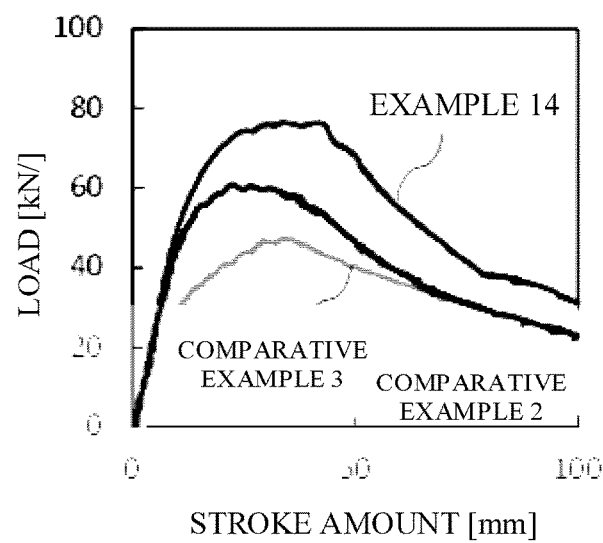
FIG. 20 is a load-stroke diagram in a simulation of conventional structures and a structure according to the present invention.

FIG. 20 illustrates a load-stroke diagram of Comparative Examples 2, 3 and Example 14. FIG. 20 illustrates that the maximum load and the absorbed energy are higher in Example 14 than in Comparative examples 2, 3. These results showed that the bumper beam according to the present invention has higher proof stress and higher absorbed energy performance than those of the bumper beams of Patent Document 1 and Patent Document 2.

INDUSTRIAL APPLICABILITY

The present invention can be used as a closed cross-sectional structure member receiving bending deformation such as a front bumper beam, a rear bumper beam, and a side sill which are attached to a vehicle such as an automobile.

EXPLANATION OF CODES 1 bumper beam
2 inner member
3 outer member
10 hollow member
11 collision side wall part
11a first collision side wall part
11b second collision side wall part
12 opposed collision side wall part
13 first side wall part
14 second side wall part
15 first inner wall part
16 second inner wall part
17 third inner wall part
18 fourth inner wall part
19 inclined wall part
20 inclined wall part
21 inner inclined wall part
22 inner inclined wall part
25 closing plate
30 hat-shaped member
30a, 30b flange of hat-shaped member
30c, 30d side surface of hat-shaped member
30e top surface of hat-shaped member
40 reinforcement
40a, 40b side surface of reinforcement
40c top surface of reinforcement
40d, 40e ridge line part between top surface and side surface of reinforcement
40f, 40g inclined surface of reinforcement
50 protrusion
50a, 50b side surface of protrusion
50c top surface of protrusion
50d, 50e ridge line part between top surface and side surface of protrusion
50f, 50g ridge line part between side surface of protrusion and top surface of hat-shaped member
50h, 50i inclined surface between side surface of protrusion and top surface of hat-shaped member
60 supporting pole
61 pole
70 automobile body structure
100 conventional bumper beam
101 hat-shaped member
101a, 101b flange of hat-shaped member
101c, 101d side surface of hat-shaped member
101e top surface of hat-shaped member
101f, 101g ridge line part between top surface and side surface of hat-shaped member
200 conventional bumper beam
201 hat-shaped member
201a, 201b flange of hat-shaped member
201c, 201d side surface of hat-shaped member
201e top surface of hat-shaped member
202 reinforcement
300 conventional bumper beam
301 hat-shaped member
301a, 301b flange of hat-shaped member
301c, 301d side surface of hat-shaped member
301e top surface of hat-shaped member
302 reinforcement
A to C closed cross-section
a height of outer member
b height of protrusion
c width of outer member
d width of protrusion
e1 height of inclined surface
e2 width of inclined surface
f1 height of inclined surface
f2 width of inclined surface

The invention claimed is:

1. A closed cross-sectional structure member comprising a hollow member, the hollow member having, in a cross-section with a member longitudinal direction as a normal, a collision side wall part, an opposed collision side wall part, a first side wall part, a second side wall part, a first inner wall part, a second inner wall part, a third inner wall part, and a fourth inner wall part, wherein:
the collision side wall part is a wall part located on a collision side;
the opposed collision side wall part is a wall part opposing the collision side wall part and located on a side opposite to the collision side;
the first side wall part and the second side wall part are a pair of wall parts connecting with end portions of the collision side wall part and end portions of the opposed collision side wall part;
the first inner wall part is a wall part extending from the first side wall part to an inside of the hollow member;
the second inner wall part is a wall part extending from the second side wall part to the inside of the hollow member;
the third inner wall part is a wall part connecting with the first inner wall part and the collision side wall part; and
the fourth inner wall part is a wall part connecting with the second inner wall part and the collision side wall part, wherein a ratio (b/a) between a height b of each of the third inner wall part and the fourth inner wall part and a length a from the opposed collision side wall part to the collision side wall part is 0.15 to 0.35.

2. The closed cross-sectional structure member according to claim 1, wherein:
the collision side wall part has a first collision side wall part and a second collision side wall part;
the first collision side wall part connects with a collision side end portion of the first side wall part and a collision side end portion of the second side wall part;
the second collision side wall part connects with a collision side end portion of the third inner wall part and a collision side end portion of the fourth inner wall part; and
the first collision side wall part and the second collision side wall part are joined together.

3. The closed cross-sectional structure member according to claim 1, wherein one closed cross-sectional space is formed in a region surrounded by the opposed collision side wall part, a part of the first side wall part, the first inner wall part, the third inner wall part, a part of the collision side wall part, the fourth inner wall part, the second inner wall part, and a part of the second side wall part.

4. The closed cross-sectional structure member according to claim 1, further comprising
inclined wall parts formed between the collision side wall part and the first side wall part and between the collision side wall part and the second side wall part, respectively.

5. The closed cross-sectional structure member according to claim 4, wherein
a ratio between a height el of the inclined wall part and the length a is 0.05 to 0.20.

6. The closed cross-sectional structure member according to claim 1, further comprising
inner inclined wall parts formed between the first inner wall part and the third inner wall part and between the second inner wall part and the fourth inner wall part, respectively.

7. The closed cross-sectional structure member according to claim 6, wherein
a ratio between a height f1 of the inner inclined wall part and the length a is 0.05 to 0.20.

8. The closed cross-sectional structure member according to claim 1, wherein
one end portion of the opposed collision side wall part projects from the first side wall part to an outside of the hollow member, and another end portion of the opposed collision side wall part projects from the second side wall part to the outside of the hollow member, in the cross-section with the member longitudinal direction as a normal.

9. The closed cross-sectional structure member according to any one claim 1, further comprising
a closing plate, a hat-shaped member, and a reinforcement, wherein:
the closing plate is located on an opposed collision side;
the hat-shaped member has two flanges joined to the closing plate, a pair of side surfaces extending from the flanges to a collision side, a top surface connecting with the pair of side surfaces, and a protrusion provided at the top surface and projecting to the collision side;
the reinforcement has a pair of side surfaces joined to the hat-shaped member, and a top surface connecting with the pair of side surfaces;
the opposed collision side wall part comprising the closing plate and the flanges of the hat-shaped member;
the first side wall part and the second side wall part are composed of comprising the pair of side surfaces of the hat-shaped member and the pair of side surfaces of the reinforcement; and
the collision side wall part comprising the protrusion of the hat-shaped member and the top surface of the reinforcement.

10. An automobile body structure, comprising
the closed cross-sectional structure member according to claim 1, wherein
the collision side wall part is located on a vehicle-exterior side with respect to the opposed collision side wall part.

11. The closed cross-sectional structure member according to claim 2, wherein
one closed cross-sectional space is formed in a region surrounded by the opposed collision side wall part, a part of the first side wall part, the first inner wall part, the third inner wall part, a part of the collision side wall part, the fourth inner wall part, the second inner wall part, and a part of the second side wall part.

12. The closed cross-sectional structure member according to claim 2, further comprising
inclined wall parts formed between the collision side wall part and the first side wall part and between the collision side wall part and the second side wall part, respectively.

13. The closed cross-sectional structure member according to claim 3, further comprising
inclined wall parts formed between the collision side wall part and the first side wall part and between the collision side wall part and the second side wall part, respectively.

14. The closed cross-sectional structure member according to claim 11, further comprising
inclined wall parts formed between the collision side wall part and the first side wall part and between the collision side wall part and the second side wall part, respectively.

15. The closed cross-sectional structure member according to claim 12, wherein
a ratio between a height el of the inclined wall part and the length a is 0.05 to 0.20.

16. The closed cross-sectional structure member according to claim 13, wherein
a ratio between a height el of the inclined wall part and the length a is 0.05 to 0.20.

17. The closed cross-sectional structure member according to claim 14, wherein
a ratio between a height el of the inclined wall part and the length a is 0.05 to 0.20.

18. The closed cross-sectional structure member according to claim 2, further comprising
inner inclined wall parts formed between the first inner wall part and the third inner wall part and between the second inner wall part and the fourth inner wall part, respectively.

19. The closed cross-sectional structure member according to claim 3, further comprising
inner inclined wall parts formed between the first inner wall part and the third inner wall part and between the second inner wall part and the fourth inner wall part, respectively.

20. The closed cross-sectional structure member according to claim 4, further comprising
inner inclined wall parts formed between the first inner wall part and the third inner wall part and between the second inner wall part and the fourth inner wall part, respectively.

* * * * *